(12) United States Patent
Meganathan et al.

(10) Patent No.: US 10,551,810 B2
(45) Date of Patent: Feb. 4, 2020

(54) SYSTEM AND METHOD TO IMPROVE THE PRIVACY OF HOMES AND OTHER BUILDINGS HAVING A CONNECTED HOME SECURITY/CONTROL SYSTEM AND SUBJECT TO INTRUSIONS BY UNMANNED AERIAL VEHICLES

(71) Applicant: Ademco Inc., Golden Valley, MN (US)

(72) Inventors: Deepak Sundar Meganathan, Bangalore (IN); Sreevas Raghavan, Bangalore (IN)

(73) Assignee: ADEMCO INC., Golden Valley, MN (US)

( * ) Notice: Subject to any disclaimer, the term of this patent is extended or adjusted under 35 U.S.C. 154(b) by 241 days.

(21) Appl. No.: 15/628,146

(22) Filed: Jun. 20, 2017

(65) Prior Publication Data

US 2018/0364662 A1    Dec. 20, 2018

(51) Int. Cl.
*G05B 19/042* (2006.01)
*G08G 5/00* (2006.01)

(52) U.S. Cl.
CPC .. *G05B 19/042* (2013.01); *G05B 2219/25011* (2013.01)

(58) Field of Classification Search
CPC .................................................. G05B 19/042
See application file for complete search history.

(56) References Cited

U.S. PATENT DOCUMENTS

| | | |
|---|---|---|
| 9,085,362 B1 | 7/2015 | Kilian et al. |
| 9,175,934 B1 | 11/2015 | Kilian |
| 9,862,489 B1 * | 1/2018 | Weinstein ............. B64C 39/024 |
| 2015/0317924 A1 * | 11/2015 | Park ........................ G09F 21/16 40/213 |
| 2015/0339912 A1 * | 11/2015 | Farrand ................ G08B 25/001 340/501 |
| 2016/0247407 A1 | 8/2016 | Paczan et al. |

(Continued)

FOREIGN PATENT DOCUMENTS

WO    2015029007 A1    3/2015

OTHER PUBLICATIONS

Extended European search report from corresponding EP patent application 18175581.0, dated Nov. 9, 2018.

(Continued)

*Primary Examiner* — Kira Nguyen
(74) *Attorney, Agent, or Firm* — Husch Blackwell LLP

(57) ABSTRACT

A privacy protection method and system (10) is provided for a building, home, apartment, or other area (12) protected by a connected security system (14). The system (10) includes a detector drone (16) and the security system (14). The drone (16) includes at least one drone detecting sensor (24) and automatically initiates a wireless signal (30) in response to the sensor (24) indicating the presence of a foreign drone (17). The security system (14) includes a central processor (40) and at least one electronic device (46) having a privacy condition wherein the device (46) protects against privacy intrusions by a foreign drone (17) and a non-privacy condition wherein the device (46) does not protect from the privacy intrusion. The processor (40) is configured to command the device (46) to change from the non-privacy condition to the privacy condition in response to the wireless signal (30) from the detector drone (16).

19 Claims, 4 Drawing Sheets

(56) References Cited

U.S. PATENT DOCUMENTS

2017/0092138 A1\* 3/2017 Trundle ................ B64C 39/024
2017/0259920 A1\* 9/2017 Lai ........................... B64D 1/18
2018/0162530 A1\* 6/2018 Klein ..................... B64C 39/02

OTHER PUBLICATIONS

Miki Takajiro—Nippon, Year of the Drone—Security Drones at the Tokyo Marathon, Apr. 12, 2016.
Jason Reagan, Japanese Firm Launches Commercial Security Drone, Dec. 22, 2015.
Tim Hornyak, Secom security drone follows, photographs intruders, May 22, 2015.

\* cited by examiner

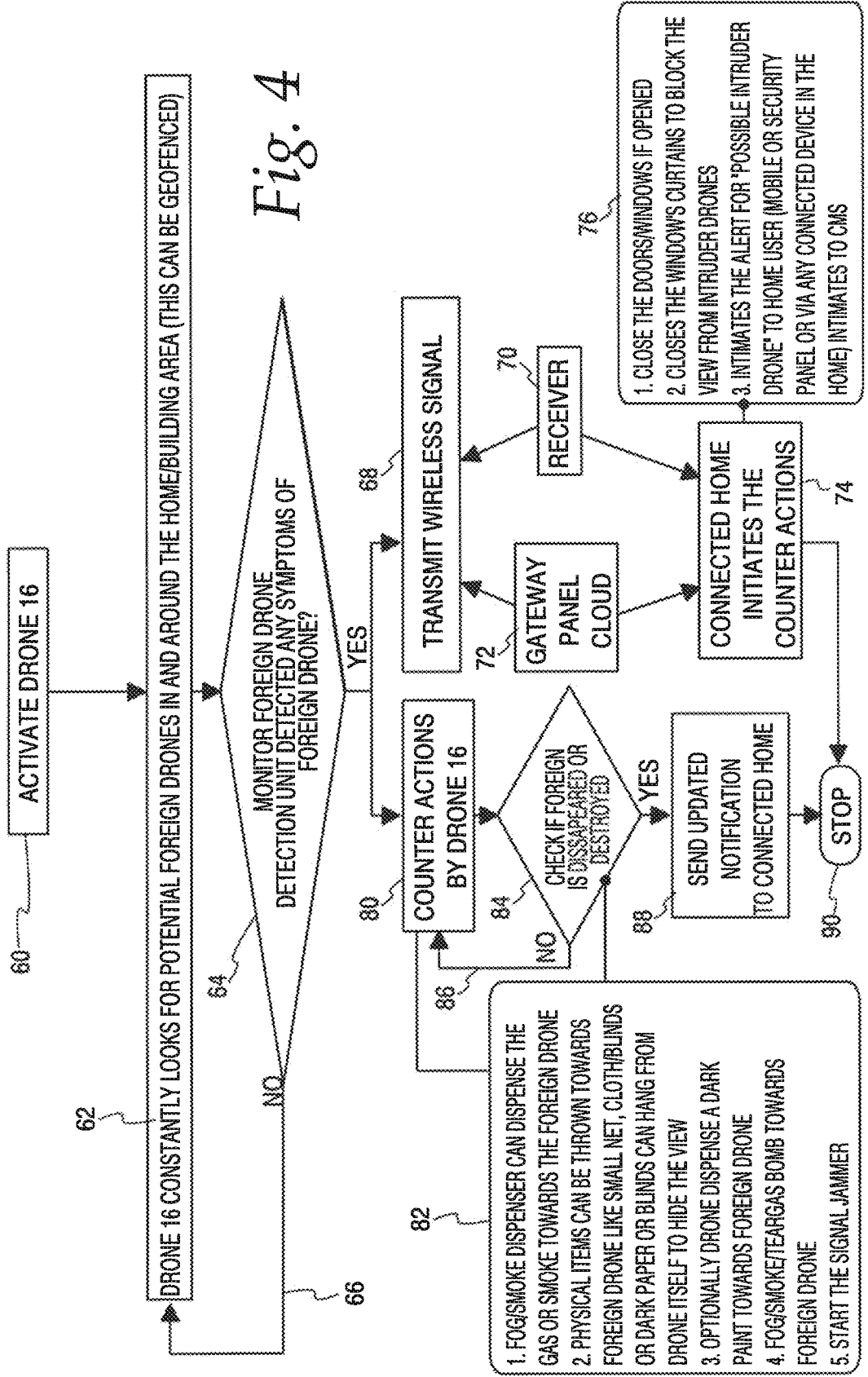

SYSTEM AND METHOD TO IMPROVE THE PRIVACY OF HOMES AND OTHER BUILDINGS HAVING A CONNECTED HOME SECURITY/CONTROL SYSTEM AND SUBJECT TO INTRUSIONS BY UNMANNED AERIAL VEHICLES

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

This disclosure relates to connected security/controls systems for use in homes, offices, apartments, businesses, and other residential and work-related areas to monitor and/or control wireless electronic devices, such as smoke or gas sensors/detectors, thermostats, heating/venting/air-conditioning (HVAC) systems, lights, video cameras, sound systems, window and door sensors, door locks, and, in particular, automated window shades, blinds, and curtains, automated windows, automated doors, user alert devices such as an audio or visual alarm, and other electronic devices that can serve to protect the privacy of an area protected by the connected security/control system. This disclosure also relates to unmanned aerial vehicles, which are commonly referred to as "drones".

BACKGROUND

Unmanned aerial vehicles (hereinafter "drones") are becoming increasingly prolific in their availability and use, especially in view of the combination of decreasing cost and increasing quality of drones, Typically, drones are equipped with sensors, including, for example, cameras, GPS circuitry, wireless transceivers, gyroscopes, compasses, three axis accelerometers, and even more exotic componentry such as radar, sonar and jammers. Occasionally, such drones have been used to intrude on the privacy of others and/or to monitor the property, homes, or buildings of others, sometimes for the purposes of supporting a physical intrusion into the property, home, or building. This presents an obvious concern for privacy and safety. While some solutions have been proposed to detect such "intruder" drones and to dissuade such "intruder" drones through various means such as by disabling such drones or by capturing such drones, there is always room for improvement, and in particular, there is room for improvement in protecting the privacy within homes, offices, apartments, businesses, and other residential and work-related areas from invasions of privacy by such "intruder" drones.

SUMMARY

In accordance with one feature of this disclosure, a privacy protection system is provided for a building, home, apartment, or other area protected by a connected security system. The privacy protection system includes a detector drone and a connected security system. The drone includes a wireless transmitter, at least one drone detecting sensor, and a processor operably connected to the wireless transmitter and the at least one drone detecting sensor. The processor is configured to automatically initiate a wireless signal from the wireless transmitter in response to a signal from the at least one drone detecting sensor indicating that the at least one drone detecting sensor has detected a foreign drone. The connected security system protects a first area and includes a central processor and at least one electronic device operably connected to the central processor to be controlled by the central processor. The at least one electronic device has a privacy condition wherein the device protects the first area against a privacy intrusions by a drone located outside of the first area and a non-privacy condition wherein the device does not protect the first area from the privacy intrusion. The central processor is configured to automatically command the at least one electronic device to change from the non-privacy condition to the privacy condition in response to the wireless signal from the detector drone.

As one feature, the at least one electronic device includes at least one of an automated window blind, an automated window curtain, an automated window shade, an automated window shutter, an automated window, an automated door, and a user alert device.

In one feature, the at least one drone detecting sensor includes at least one of an acoustical sensor, an optical sensor, a camera, wireless signal finder, a thermal sensor, a sonar, and a radar.

According to one feature, the detector drone further includes a countermeasure device controlled by the processor, the countermeasure device being activated by a command signal from the processor.

As one feature, the countermeasure device includes a deployable screen have a stowed condition wherein the screen is stowed for deployment and a deployed condition wherein the screen is deployed to block the foreign drone from invading the privacy of the first area, the deployable screen changing from the stowed condition to the deployed condition in response to the command signal from the processor.

In one feature, the screen hangs from the detector drone in the deployed condition.

According to one feature, the screen is separated from the detector drone and directed toward the foreign drone in the deployed condition.

As one feature, the countermeasure device includes a smoke dispenser that dispenses a smoke screen in the deployed condition.

In one feature, the smoke dispenser is separated from the detector drone and directed toward the foreign drone in the deployed condition.

According to one feature, the countermeasure device includes a paint dispenser that dispenses paint at the foreign drone in the deployed condition.

As one feature, the countermeasure device includes a signal jammer that attempts to jam any wireless signals from the foreign drone in the deployed condition.

In one feature, the connected security system further includes at least one additional electronic device operably connected to the central processor to be controlled by the central processor, the central processor configured to automatically command the at least one additional electronic device to change from a first condition to a second condition in response to the wireless receiver receiving the wireless signal from the detector drone.

According to one feature, the at least one additional electronic device comprises at least one of a television, light, music system, door sensor, window sensor, gas sensor, heat sensor, smoke sensor, motion sensor, thermostat, and HVAC system.

As one feature, the central processor is located in the first area, the connected security system further includes a wireless receiver operably connected to the central processor, and the central processor is configured to automatically command the at least one electronic device to change from the non-privacy condition to the privacy condition in response to the wireless receiver receiving the wireless signal from the detector drone.

In one feature, the central processor is located remote from the first area.

In one feature, the processor of the detector drone is configured to navigate the drone between a plurality of stay locations, with the drone remaining stationary at each stay location for a period of time while the at least one drone detecting sensor remains operable to detect a foreign drone. In a further feature, the processor of the detector drone is configured to navigate the detector drone from the stay location toward a foreign drone in response to the signal from the at least one drone detecting sensor indicating that the at least one drone detecting sensor has detected a foreign drone.

According to one feature of this disclosure, a computer processor implemented method is provided utilizing a detector drone to protect the privacy of a building, home, apartment, or other area protected by a connected security system. The detector drone includes a wireless transmitter, and at least one drone detecting sensor. The connected security system protects a first area and includes a wireless receiver and at least one electronic device having a privacy condition wherein the device protects the first area against a privacy intrusions by a drone located outside of the first area and a non-privacy condition wherein the device does not protect the first area from the privacy intrusion. The method includes the steps of: (a) initiating a wireless signal from the wireless transmitter in response to a signal from the at least one drone detecting sensor indicating that the at least one drone detecting sensor has detected a foreign drone; and (b) automatically commanding the at least one electronic device to change from the non-privacy condition to the privacy condition in response to the wireless receiver receiving the wireless signal from the detector drone.

In one feature, the at least one electronic device includes at least one of an automated window blind, an automated window curtain, an automated window shade, an automated window shutter, an automated window, an automated door, and a user alert device.

According to one feature, the at least one drone detecting sensor includes at least one of an acoustical sensor, an optical sensor, a camera, wireless signal finder, a thermal sensor, a sonar, and a radar.

As one feature, the detector drone further includes a countermeasure device and the method further comprises automatically activating the countermeasure device in response to the signal from the at least one drone detecting sensor.

In one feature, the connected security system further includes at least one additional electronic device having a first condition and a second condition, and the method further comprises the step of automatically commanding the at least one additional electronic device to change from the first condition to the second condition in response to the wireless receiver receiving the wireless signal from the detector drone.

According to one feature, a privacy protection system is provided for a building, home, apartment, or other area protected by a connected security system. The privacy protection system includes at least one computer processor configured to implement the above-described method.

As one feature, at least one non-transitory computer readable storage medium is provided and includes instructions for implementing the above-described method in at least one computer processor executing the instructions.

Other features and advantages will become apparent from a review of the entire specification, including the appended claims and drawings.

BRIEF DESCRIPTION OF THE DRAWINGS

FIG. 4 is a flow chart representing a method according to this disclosure.

DETAILED DESCRIPTION

Figure 1:
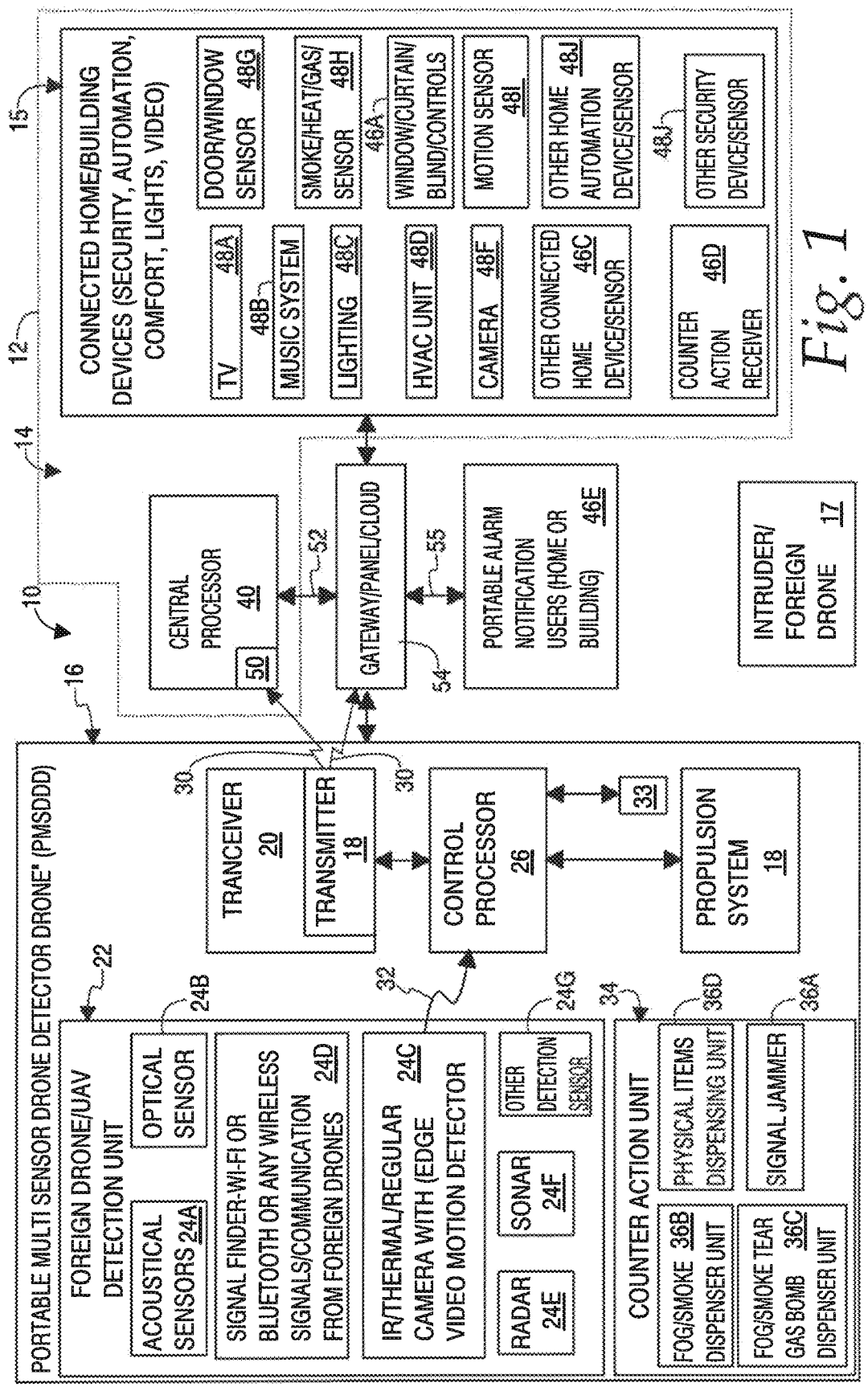
FIG. 1 is a block diagram representing a system and method according to this disclosure.

As best seen in FIG. 1, a privacy protection system 10 is provided for a building, home, apartment, or other area 12 protected by a connected security/control system 14 that monitors and/or controls a plurality of connected electronic devices 15 via signals that can be transmitted either wirelessly or via hard lines depending upon the configuration of each of the electronic devices 15. In the illustrated embodiment, the system 10 includes the connected security system 14 and a detector drone 16 that is configured to detect an intruder/foreign drone 17 that may be seeking to invade/intrude on the privacy of the protected area 12 and to automatically alert the security system 14 so that the security system 14 can automatically control of one or more of the electronic devices 15 so as to protect the privacy of the protected area 12 against such an invasion/intrusion of privacy.

In the illustrated embodiment, the detector drone 16 is a portable, multi-sensor unit, and includes a propulsion system 18 in the form of four electric motor driven propellers (best seen in FIG. 2), a wireless transmitter 19 as part of a wireless transceiver/communication unit 20, a foreign drone detection unit 22 including a plurality of drone detecting sensors 24, and a control processor 26 operably connected to the propulsion system 18, the transmitter 19, the wireless transceiver/communication unit 20 and the sensors 24 to receive signals therefrom and send control signals thereto. The sensors 24 in the drone detection unit 22 can include one or more acoustical sensors 24A, one or more optical sensors 24B, one or more cameras 24C which can be in the form of an infrared, thermal imaging, or regular camera, a wireless signal finder 24D to detect any wireless signals/communications transmitting from a foreign drone 17, a radar 24E, a sonar 24F, and other detection sensors 24G, such as, for example, a thermal or infrared sensor. The propulsion system 18, transmitter 19, wireless transceiver/communication unit 20, and sensors 24A-24G can be of any suitable form or construction, many of which are known. The processor 26 is configured to automatically initiate a wireless signal 30 from the wireless transmitter 19 in response to a signal 32 from one or more of the sensors 24 indicating that one or more of the sensors 24 have detected a foreign drone 17. In this regard, the processor 26 may executed a plurality of instructions that have been stored in an electronic memory device 33 operably connected to the processor 26. The wireless signal 30 is used to alert the security system 14 of the foreign drone 17 so that the security system 14 can take steps to protect the privacy of the protected area 12 against privacy invasions/intrusions by the foreign drone 17.

Figure 2:
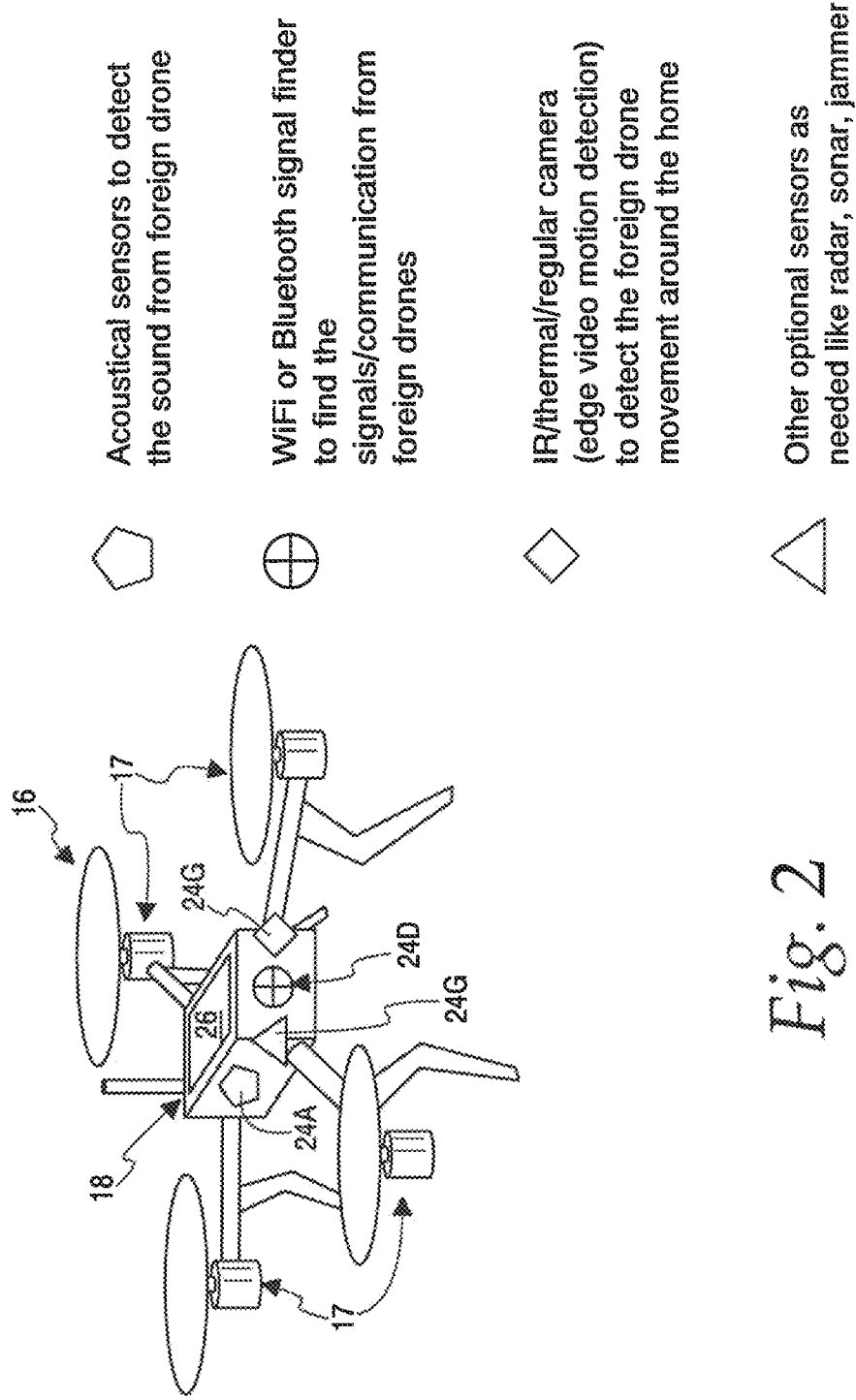
FIG. 2 is a diagrammatic representation of a "detector drone" for use in the system and method according to this disclosure.

Optionally, as shown in FIGS. 1 and 2, the detector drone 16 can further include a counteraction/countermeasure action unit 34, with the countermeasure action unit 34 including one or more countermeasure devices 36. Each of the countermeasure devices 36 has an inactive or stowed condition and an active or deployed condition that is controlled by the processor 26. In the illustrated embodiment, the countermeasure devices 36 include a wireless signal jammer 36A to jam wireless signals to/from a foreign drone 17, a fog/smoke/gas/paint dispenser unit 36B that remains fixed to the drone 16 while dispensing a smoke screen in the deployed condition to block or inhibit viewing of the protected area 12 by a foreign drone 17, a fog/smoke/gas/paint dispenser bomb unit 36C that can be separated from the drone 16 and directed towards a foreign drone 17 to dispense a smoke/paint screen in the deployed condition to block or inhibit viewing of the protected area 12 by a foreign drone 17, and/or a physical item dispensing unit 36D having a deployable screen 38 having a stowed condition wherein the screen is stowed for deployment and a deployed condition wherein the screen is deployed to block a foreign drone 17 from invading the privacy of the first area, In one form, the deployable screen 38 remains attached to the drone 16 while the drone 16 maneuvers to position the screen 38 between a foreign drone 17 and the protected area 12 to block or inhibit viewing of the protected area 12 by a foreign drone 17. In another form the deployable screen 38 can be separated from the drone 16 and directed toward a foreign drone 17 in an attempt to cloak any surveillance devices on the foreign drone 17 and/or disable the foreign drone 17. The screen 38 can be made of any suitable material, including any suitable cloth or paper, mesh, or fabric material. The processor 26 is configured to automatically activate any one or more of the countermeasure devices 36 in response to the signal 32 while maneuvering the drone 16 to utilize the countermeasure devices 36 to their best advantage.

The connected security system 14 of the illustrated embodiment includes a central processor 40 and the plurality of electronic devices, shown at 15, that are operably connected to the central processor 40 to be monitored and/or controlled by the central processor 40. In the illustrated embodiment, the electronic devices 15 includes a plurality of electronic devices 46, each device 46 having a privacy condition wherein the device 46 protects the area 12 against a privacy intrusion by a foreign drone 17 and a non-privacy condition where the device 46 does not protect the area 12 from the privacy intrusion. The electronic devices 46 can be provided in any suitable form and in the illustrated embodiment include an automated window blinds, shades, curtains, or shutters 46A, automated windows 46B, and automated doors 46C, each of which would have a closed position for the privacy condition and an open position for the non-privacy condition. A device 46 can also be provided in the form of a user alert/alarm device 46D, such as an audio or a visual alarm, wherein the alarm 46D is inactive in the non-privacy condition and active in the privacy condition so as to alert occupants within the area 14 of the presence of an intruder of a foreign drone 17. In this regard, the alarm can be one or more stationary units 46D mounted within the protected area 12, or can be provided in the form of a portable communications device 46E, such as a cell phone or smart phone, having an application that will alert a user of the protected area 12 to the presence of a foreign drone 17 in the vicinity of the protected area 12.

The connected home security system 14 can also include other electronic devices 48 that are monitored and/or controlled by the central processor 40 including, for example, TV's 48A, music systems 48B, lighting 48C, HVAC units 48D, cameras 48F, door/window sensors 48G, smoke/heat/gas sensors and detectors 48H, motion sensors 48I and other connected home sensors, automatic devices, and security devices 48J. Some or all of the devices 48 may also have a privacy condition wherein the device 48 protects the area 12 against an intrusion and a non-privacy condition wherein the device does not protect the area 12 from intrusion. For example, the lighting 48C can be turned on in the non-privacy condition and turned off in the privacy condition so as to darken the area 12. By way of further example, a TV 48A can also be on in a non-privacy condition and turned off in a privacy condition so as to again darken the area 12 and to prevent a foreign drone 17 from observing anything that may have been playing on the TV. Similarly, the music system 48A can be on in a non-privacy condition and turned off in a privacy condition to prevent a foreign drone 17 from listening or recording what is played on the music system. As another example, the cameras 48F, motion sensors 48I, and window/door sensors 48G can be activated in the privacy condition so as to protect the area 12 against a physical intrusion that may be instigated by the foreign drone 17 determining that the area 12 is unoccupied. The devices 46 and 48 can either be connected to the central processor 40 via hard lines or via a wireless signal, and can be of any suitable configuration and form, many of which are known for connected home/business security and control systems.

The security system 14 can include a wireless receiver 50 to directly receive the wireless signal 30 from the wireless transmitter 19 of the protector drone 16, or can receive a signal 52 via a gateway or panel or the cloud/internet, as shown at 54, alerting the processor 40 to the wireless signal 30 from the protector drone 20. In many applications, the central processor 40 and the wireless receiver 50 will be part of an integrated control panel unit, as is commonly employed in connected home/business security and control systems. As shown at 55, the portable alert device 46 can receive notification of the foreign drone 17 directly from the gateway/panel/cloud rather than from a transmission directly from the security system 14 or the drone 16. While the central processor 40 is shown as being located within the protected area 12, in some applications it may be desirable for the central processor 40 to be located remote from the protected area 12. The central processor 40 is configured to automatically command one or more of the devices 46 and 48 to change from a first condition to a second condition, such as from the non-privacy condition to the privacy condition, in response to the wireless signal 30 from the detector drone 16.

Figure 3:
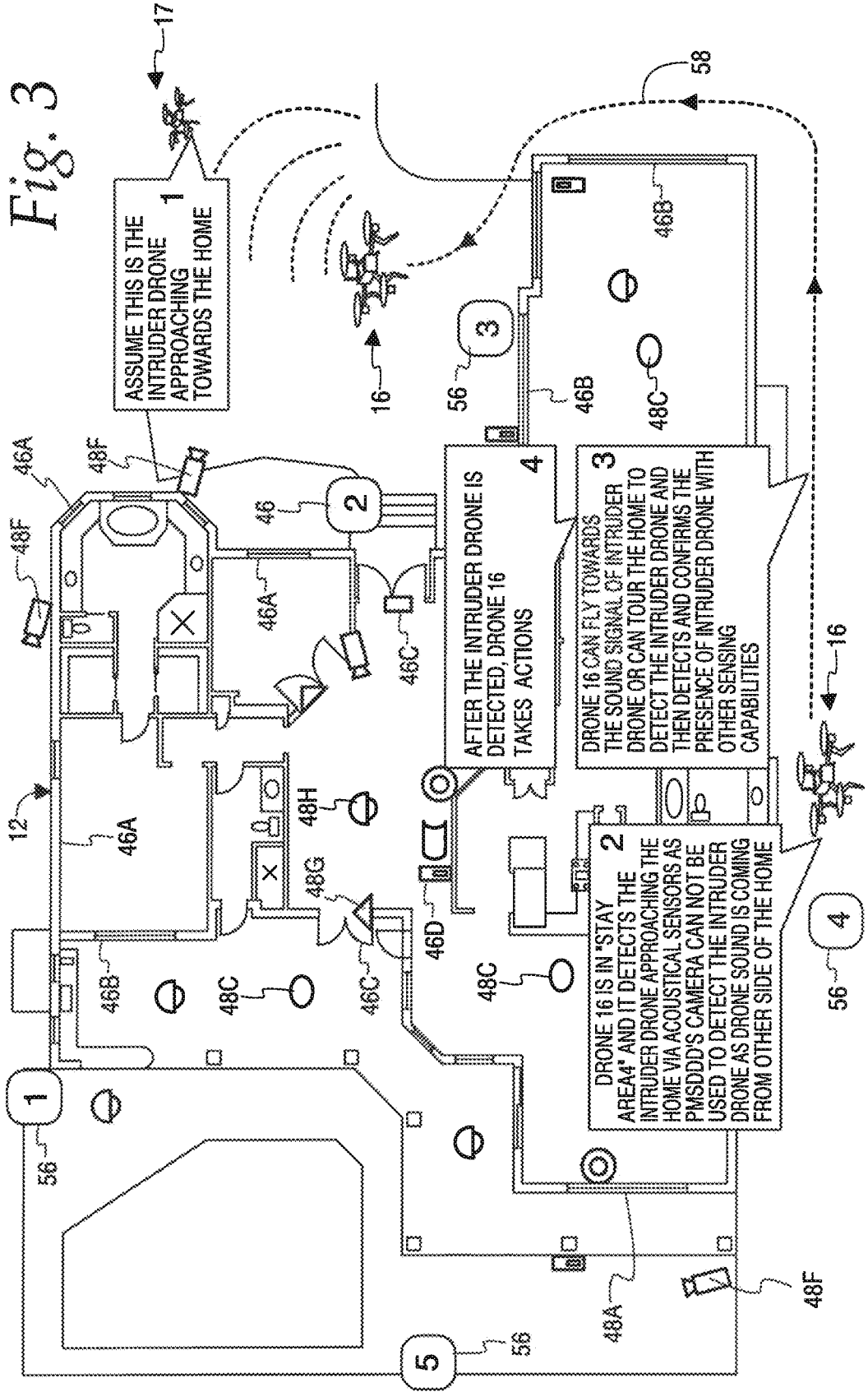
FIG. 3 is a diagrammatic representation of a home/building incorporating the system and method according to this disclosure.

The processor 26 of the drone 16 can be configured so that in one mode of operation ("patrol mode") the processor 26 navigates the drone 16 so that drone 16 continuously patrols the vicinity surrounding the protected area 12. The processor 26 can also be further configured for another mode of operation ("stop location mode") best seen in FIG. 3, so that the processor 26 navigates the drone 16 to move between a plurality of predefined locations 56 ("stay locations") in the vicinity of the protected area 12 according to a predetermined schedule, with the drone 16 remaining stationary at each stay location 56 with its propulsion system 18 turned off (propeller shutdown) while the sensors 24 continue to monitor for a foreign drone 17. In the embodiment illustrated in FIG. 3, the processor 26 of the drone 16 is programmed so that the drone 16 will move clockwise around the vicinity/perimeter of the protected area 12 (shown in the form of a private home or building), with the drone 16 moving in numerical order from the stay location 54 indicated with the number 1 through the numerical sequence of stay locations 54, with one "circuit" being completed when the drone reaches the stay location 54 numbered 5. The drone 16 pauses/rests at each of the stay locations 54 for a predetermined period of time that can be customized for each of the stay locations 54, The "stay location" mode of operation allows for the power consumption of the drone 16 to be minimized while it is performing its detection function. Furthermore, the ability of at least some the sensors 24 to detect a foreign drone 17 may be improved when the drone 16 is at a stay location 54 with the propulsion system 18 turned off so as to not cause interference with the sensors 24. For example, the ability of the acoustical sensors 24A may be improved without the noise generated by the propulsion system 18 when it is operating. In the event that a foreign drone 17 is detected while the drone 16 is at a stay location 54, the processor 26 is configured to initiate the propulsion system 18 of the drone 16 and to fly the drone 16 toward the foreign drone 17 in an effort to further detect and confirm the presence of the foreign drone 17 and/or to enable the successful deployment of the countermeasure devices 34, as shown at 58 in FIG. 3.

With reference to FIG. 4, the system 10 initiates the operation of the detector drone 16, as shown at 60, and the processor 26 operates the sensors 24 to continuously look for a potential foreign drone 17 in the vicinity of the protected area 12, as shown at 62. As previously discussed, the detector drone 16 can either continuously patrol around the protected area 12, or can move from one stay location 54 to another based upon a predetermined time schedule, with the protector drone 16 pausing for a time period at each of the stay locations 54 so as to minimize its power usage. The processor 26 continuously receives the signals 32 from the sensors 24 and queries as to whether or not any of the signals 32 indicates the detection of a foreign drone 17, as shown at 64. If there is no indication of a foreign drone 17, the sensors 24 continue to search for a foreign drone 17, as shown at 66. If the processor 26 determines that a foreign drone 17 has been detected, the processor 26 operates the transmitter 19 to initiate the wireless signal 30 indicating that a foreign drone 17 has been detected, as shown at 68. This signal 30 is either transmitted directly to receiver 50 of the security system 14 as shown at 70, or indirectly via the gateway/panel/cloud 54, as shown at 72. In response to the signal 30, the central processor 40 initiates counteractions to protect the privacy of the protected area 12 by operating one or more of the devices 46 and 48 to change from the non-privacy condition to the privacy condition, as shown at 74. In this regard, for example, the processor 40 could command the electronic devices 46A-46C to close doors and windows and to close window curtains/shades/blinds/shutters to block the view of the foreign drone 17 into the protected area 12, and/or can initiate the alert devices 46D and 46E in order to warn occupants/users of the protected area 12 of the presence of a foreign drone 17, as shown at 76. Additionally, as shown at 80 and 82, the processor 26 of the drone 16 can initiate one or more of the countermeasure devices 34 if a foreign drone 17 is detected. The processor 26 will continue to receive and process the signals 32 from the sensors 24 to determine if the foreign drone 17 has exited the vicinity of the area 12 or if the foreign drone 17 has been disabled, as shown at 84. If the foreign drone 17 has not left the vicinity and/or has not been disabled, the detector drone 16 will continue to initiate one or more of the countermeasures as shown at 86. If the processor 26 determines that the foreign drone 17 has exited the vicinity or been disabled, it will initiate an additional wireless signal from the transmitter 19 to alert the security system 14 that the foreign drone 17 is no longer a threat, as shown at 88, and the privacy protection actions can be stopped as shown at 90.

It should be understood that while the illustrated embodiments may prove highly desirable for a number of applications, this disclosure contemplates other embodiments and is not intended to be limited to the exact embodiments shown. For example, while the illustrated drone is shown as including both a foreign drone detection unit 22 and a countermeasure unit 34, in some applications, the countermeasure unit 34 may not be desirable. By way of further example, while the illustrated embodiment includes a plurality of sensors 24, in some applications it may be desirable for fewer or more than the specific number of sensors shown to be utilized. Accordingly, the concepts disclosed herein are not intended to be limited unless expressly recited in one of the appended claims.

It should be appreciated that the disclosed system and method 10 provide a simple and automatic way to detect intruder/foreign drones and automatically take action in response to such detection so as to protect the privacy of any area protected by a connected security/control system. It should further be appreciated that because the detector drone 16 provides mobility to the detecting sensors 24, the disclosed system and method 10 provide the ability to detect intruder/foreign drones without requiring that multiple drone detecting sensors be located throughout an area protected by a connected security/control system.

As used herein, the term "processor" is intended to include any logic circuitry that responds to and processes the basic instructions/algorithms and logic operations to monitor and control other electronic devices and can be of any suitable design and configuration, many of which are known, including, for example, microprocessors. The term "memory" can include any device, or combination of devices, capable of storing data/information and being automatically accessed by a computer processor that is in communication therewith.

The invention claimed is:

1. A privacy protection system for a building, a home, an apartment, or another area protected by a connected security system, the privacy protection system comprising:
    a detector drone including a wireless transmitter, a drone detecting sensor, and a drone processor operably connected to the wireless transmitter and the drone detecting sensor, the drone processor configured to automatically initiate a wireless signal from the wireless transmitter in response to receiving a sensor signal from the drone detecting sensor indicating that the at least one drone detecting sensor has detected a foreign drone and to navigate the detector drone between a plurality of stay locations, and the detector drone configured to remain stationary at each of the plurality of stay locations for a period of time while the drone detecting sensor remains operable to detect the foreign drone; and the connected security system protecting a first area, the connected security system including a central processor and a first electronic device operably connected to the central processor to be controlled by the central processor, the first electronic device having a privacy condition, wherein the first electronic device protects the first area against a privacy intrusion by the foreign drone located outside of the first area, and a non-privacy condition, wherein the first electronic device does not protect the first area from the privacy intrusion, and the central processor configured to automatically command the first electronic device to change from the non-privacy condition to the privacy condition in response to receiving the wireless signal from the detector drone.

2. The privacy protection system of claim 1 wherein the first electronic device includes at least one of an automated window blind, an automated window curtain, an automated window, an automated door, and a user alert device.

3. The privacy protection system of claim 1 wherein the drone detecting sensor includes at least one of an acoustical sensor, an optical sensor, a camera, a wireless signal finder, a thermal sensor, a sonar, and a radar.

4. The privacy protection system of claim 1 wherein the detector drone includes a countermeasure device configured to be activated by a command signal from the drone processor.

5. The privacy protection system of claim 4 wherein the countermeasure device includes a deployable screen having a stowed condition, wherein the deployable screen is stowed for deployment and a deployed condition, wherein the deployable screen is deployed to block the foreign drone from invading privacy of the first area, the deployable screen changing from the stowed condition to the deployed condition in response to receiving the command signal from the drone processor.

6. The privacy protection system of claim 4 wherein the countermeasure device includes a smoke dispenser that dispenses a smoke screen in a deployed condition.

7. The privacy protection system of claim 4 wherein the countermeasure device includes a paint dispenser that dispenses paint at the foreign drone in a deployed condition.

8. The privacy protection system of claim 4 wherein the countermeasure device includes a signal jammer that attempts to jam any wireless signals from the foreign drone in a deployed condition.

9. The privacy protection system of claim 1 wherein the connected security system includes a second electronic device operably connected to the central processor to be controlled by the central processor, the central processor configured to automatically command the second electronic device to change from a first condition to a second condition in response to receiving the wireless signal from the detector drone.

10. The privacy protection system of claim 9 wherein the second electronic device includes at least one of a television, a light, a music system, a door sensor, a window sensor, a gas sensor, a heat sensor, a smoke sensor, a motion sensor, a thermostat, and an HVAC system.

11. The privacy protection system of claim 1 wherein the central processor is located in the first area and the connected security system includes a wireless receiver operably connected to the central processor, the central processor configured to automatically command the first electronic device to change from the non-privacy condition to the privacy condition in response to the wireless receiver receiving the wireless signal from the detector drone.

12. The privacy protection system of claim 1 wherein the drone processor is configured to navigate the detector drone from the plurality of stay locations toward the foreign drone in response to receiving the sensor signal from the drone detecting sensor.

13. A computer processor implemented method utilizing a detector drone to protect privacy of a building, a home, an apartment, or another area protected by a connected security system, a detector drone including a wireless transmitter and a drone detecting sensor, the connected security system protecting a first area and including a wireless receiver and a first electronic device having a privacy condition, wherein the first electronic device protects the first area against a privacy intrusions by a foreign drone located outside of the first area, and a non-privacy condition, wherein the first electronic device does not protect the first area from the privacy intrusion, the computer processor implemented method comprising the steps of:

(a) initiating a wireless signal from the wireless transmitter in response to receiving a sensor signal from the drone detecting sensor indicating that the drone detecting sensor has detected the foreign drone;

(b) automatically commanding the first electronic device to change from the non-privacy condition to the privacy condition in response to the wireless receiver receiving the wireless signal from the detector drone; and (c) navigating the detector drone between a plurality of stay locations such that the detector drone remains stationary at each of the plurality of stay locations for a period of time while the drone detecting sensor remains operable to detect the foreign drone.

14. The computer processor implemented method of claim 13 wherein the first electronic device includes at least one of an automated window blind, an automated window curtain, an automated window, an automated door, and a user alert device.

15. The computer processor implemented method of claim 13 wherein the drone detecting sensor includes at least one of an acoustical sensor, an optical sensor, a camera, a wireless signal finder, a thermal sensor, a sonar, and a radar.

16. The computer processor implemented method of claim 13 further comprising the step of:
automatically activating a countermeasure device of the detector drone in response to receiving the sensor signal from the drone detecting sensor.

17. The computer processor implemented method of claim 13 further comprising the step of:
automatically commanding a second electronic device of the connected security system to change from a first condition to a second condition in response to the wireless receiver receiving the wireless signal from the detector drone.

18. A privacy protection system for the building, the home, the apartment, or the another area comprising a computer processor configured to implement the computer processor implemented method of claim 13.

19. A non-transitory computer readable storage medium comprising instructions for implementing the computer processor implemented method of claim 13 in a computer processor executing the instructions.

* * * * *